United States Patent [19]

Marianowski et al.

[11] Patent Number: 4,810,485
[45] Date of Patent: Mar. 7, 1989

[54] HYDROGEN FORMING REACTION PROCESS

[75] Inventors: Leonard G. Marianowski, South Holland; Donald K. Fleming, Park Ridge, both of Ill.

[73] Assignee: Institute of Gas Technology, Chicago, Ill.

[21] Appl. No.: 113,175

[22] Filed: Oct. 23, 1987

Related U.S. Application Data

[63] Continuation-in-part of Ser. No. 899,878, Aug. 25, 1986, Pat. No. 4,702,973.

[51] Int. Cl.⁴ ............................................. C01B 3/02
[52] U.S. Cl. ............................ 423/648.1; 423/652; 423/655; 55/16; 55/158; 429/17; 429/20
[58] Field of Search ................... 55/16, 20, 158; 210/321.6; 423/248, 648 R, 648.1, 651, 652, 655; 420/463; 422/211, 212, 213; 429/17, 20, 19

[56] References Cited

U.S. PATENT DOCUMENTS

| | | | |
|---|---|---|---|
| 1,174,631 | 3/1916 | Snelling | 55/158 |
| 2,540,152 | 2/1951 | Weller | 55/16 |
| 2,734,592 | 2/1956 | Jones | 55/158 |
| 2,773,561 | 12/1956 | Hunter | 55/16 |
| 2,824,620 | 2/1958 | De Rosset | 55/16 |
| 2,911,057 | 11/1959 | Green et al. | 55/158 |
| 2,958,391 | 11/1960 | De Rosset | 55/16 |
| 2,961,062 | 11/1960 | Hunter et al. | 55/158 |
| 3,359,134 | 12/1967 | Salvadori et al. | 429/20 |
| 3,592,941 | 7/1971 | Shultz, Jr. et al. | 429/16 |
| 4,555,453 | 11/1985 | Appleby | 429/41 |
| 4,676,808 | 6/1987 | Coplan | 55/16 X |

FOREIGN PATENT DOCUMENTS

| | | |
|---|---|---|
| 0067423 | 11/1982 | European Pat. Off. . |
| 1571482 | 6/1969 | France . |
| 2017166 | 5/1970 | France . |
| 61-24167 | 2/1986 | Japan . |
| 8402429 | 6/1984 | PCT Int'l Appl. . |
| 1181220 | 2/1970 | United Kingdom . |

OTHER PUBLICATIONS

Kirk–Othmer Encyclopedia of Chemical Technology, Third Edition, vol. 12, Wiley & Sons, pp. 945, 951–952 and 944, 950–951.

Primary Examiner—Anthony Skapars
Attorney, Agent, or Firm—Thomas W. Speckman

[57] ABSTRACT

A hydrogen forming process and apparatus wherein one side of a hydrogen ion porous and molecular gas non-porous metallic foil is contacted with mixed gases comprising molecular hydrogen formed by a chemical reaction in a hydrogen production zone. The molecular hydrogen is dissociated and passed as ionic hydrogen to the other side of the metallic foil from which it is withdrawn, thereby removing hydrogen from the hydrogen production zone. This invention is particularly advantageous in favorably shifting the equilibrium of steam/methane reforming reactions and water-gas-shift reactions providing high yields of high purity hydrogen.

22 Claims, 1 Drawing Sheet

HYDROGEN FORMING REACTION PROCESS

CROSS REFERENCE TO RELATED APPLICATION

This application is a continuation-in-part application of earlier filed copending application, Ser. No. 899,878, filed Aug. 25, 1986, to issue as U.S. Pat. No. 4,702,973, Oct. 27, 1987.

BACKGROUND OF THE INVENTION

1. Field of the Invention

Improved hydrogen-forming reaction systems, such as steam/methane reforming and water-gas-shift reaction systems, utilizing a selective hydrogen ion porous metallic foil in direct association with the hydrogen forming reaction system to result in increased hydrogen production under improved hydrogen forming reaction conditions.

2. Description of the Prior Art

Hydrogen forming reaction systems such as steam/methane reforming wherein methane and water are reacted to form carbon dioxide and hydrogen and water-gas-shift reaction systems wherein carbon monoxide is reacted with water to form carbon dioxide and hydrogen, are well known to the art.

Steam/methane reforming is used as a catalytic reaction system for the production of hydrogen. Conventional catalytic systems for steam/methane reforming require catalytic reaction temperatures in the order of 1800° F. followed by rather extensive purification processes including acid gas removal and hydrogen purification to provide hydrogen suitably pure to be used for a feed stock for further processes. Catalytic steam/methane reforming processes currently used are summarized in Kirk-Othmer Encyclopedia of Chemical Technology, Third Edition, Vol. 12, John Wiley & Son, pages 944, 950-951.

The water-gas-shift reaction is frequently used following gasification of naturally occurring carbonaceous materials, such as coal, peat, oil shale and the like, wherein the product gas temperatures must be lowered to about 750° F. to drive the water-gas-shift reaction. A review of current applications and processes for the water-gas-shift reactions is given in Kirk-Othmer Encyclopedia of Chemical Technology, Third Edition, Vol. 12, John Wiley & Sons, pages 945, 951-952.

The use of metallic foils for separating gaseous mixtures, particularly hydrogen, has been known to the art as a separation or purification technique. For example, U.S. Pat. No. 1,174,631 teaches hydrogen separation from a gaseous mixture using a thin sheet or film of platinum or palladium at a temperature of preferably above about 1470° F. U.S. Pat. No. 2,773,561 teaches purification of hydrogen by permeation through a thin film of silver-palladium under a pressure differential between opposite sides of the film.

The prior art patents teach use of metallic foils for separating hydrogen from gaseous product mixtures, but do not suggest the use of metallic foils for withdrawal of hydrogen in hydrogen forming reaction systems. The parent application to this application, to issue as U.S. Pat. No. 4,702,973, teaches use of a hydrogen ion porous metallic foil to provide a dual compartment anode structure for use in molten carbonates fuel cells. In the prior patent application, the hydrogen ion porous metallic foil separates an anode reaction gas compartment from an anode fuel compartment through which hydrogen fuel contaminated with materials detrimental to the electrochemical reaction or the molten carbonates electrolyte may be maintained separated from the reaction gas compartment. The dual compartment anode configuration makes internal reforming of fuels practical in a fuel cell since a reforming catalyst may be placed in the fuel gas compartment and maintained in separated relation from the electrochemical reaction and molten carbonates electrolyte, thereby prevent poisoning of the reforming catalyst by the molten carbonates electrolyte and provide enhancement of the reforming reaction by withdrawal of formed hydrogen directly from the fuel reforming region.

SUMMARY OF THE INVENTION

It is an object of this invention to integrate a hydrogen ion porous metal foil within a hydrogen forming reaction system to provide withdrawal of pure hydrogen from the hydrogen forming reaction situs.

It is another object of this invention to provide reaction in situ hydrogen withdrawal for advantageous enhancement of hydrogen forming reaction equilibrium.

It is yet another object of this invention to provide hydrogen forming reaction processes which furnish pure hydrogen without the need of conventional chemical purification systems, especially when hydrogen is produced from sulfur contaminated, naturally occurring fuels.

It is still another object of this invention to provide a steam/methane reforming hydrogen producing process which enhances conversion of methane at lower temperatures than processes entailing separation of hydrogen from the gaseous product mixture which is withdrawn from the steam/methane reactor.

It is another object of this invention to provide a water-gas-shift hydrogen forming reaction system which may be conducted at higher temperatures and provide higher hydrogen production than prior water-gas-shift reaction processes.

The hydrogen forming reaction systems of this invention involve integration of a hydrogen ion porous and molecular hydrogen and other reaction system gas nonporous metallic foil hydrogen withdrawal system passing through the hydrogen forming reaction zone. The metallic foil may be any of a number of hydrogen ion porous metallic foils, preferably in tubular form with an internal porous support, passing directly through the hydrogen forming reaction reactor providing direct in situ withdrawal of hydrogen from very close to its site of production. Greater hydrogen withdrawal may be obtained by a plurality of such metallic foil tubes appropriately manifolded to provide lower pressure at an outlet manifold removing hydrogen from the metallic foil tubes or manifolded at each end to provide passage of a low pressure inert gas for sweeping hydrogen from the tubes.

Hydrogen forming reaction systems particularly suited for this invention are the generic class of steam/hydrocarbon reforming reactions, such as reforming of methane, propane, ethane, methanol, natural gas, and refinery gas; water-gas-shift reactions; and carbonaceous material gasification reactions, such as gasification of coal, peat, and shale. Specific reactions may be set forth as the steam/methane reforming reaction:

$$CH_4 + 2H_2O \rightarrow CO_2 + 4H_2 \qquad \text{Reaction I}$$

and the water-gas shift reaction:

$$CO + H_2O \rightarrow CO_2 + H_2 \qquad \text{Reaction II}$$

The hydrogen forming reactions are equilibrium limited, the degree of conversion being limited by the chemistry of the system, the temperature of the reaction, and, in the case of the reforming reaction, the pressure of the system. Previously low temperatures have been used to drive the water-gas-shift reaction systems. High temperatures and high steam/methane ratios have been used to drive the reforming reaction systems. By continual withdrawal of hydrogen from its site of production, in the hydrogen forming reactor according to the process of the present invention, the equilibrium will be continually shifted to the right favoring higher hydrogen production.

BRIEF DESCRIPTION OF THE DRAWING

The above objects and advantages of this invention will become more clear upon reading preferred embodiments of the invention and by reference to the drawing wherein.

DESCRIPTION OF PREFERRED EMBODIMENTS

The present invention is an improved hydrogen forming process wherein a chemical reaction forms mixed gases comprising molecular hydrogen in a hydrogen production zone. Many such hydrogen forming processes are known to the art and would be applicable for use in this invention, the steam/methane reforming reaction and the water-gas-shift reaction being two reactions advantageously suited for the process of this invention. In the hydrogen production zone, the produced mixed gases contact one side of a hydrogen ion porous and molecular gas non-porous metallic foil. Hydrogen is withdrawn in very pure form from the other side of the metallic foil, thereby removing hydrogen from the hydrogen production zone shifting the equilibrium of the hydrogen production reaction providing enhanced hydrogen production.

Hydrogen porous metallic foils transfer hydrogen by formation of hydrogen ions, or protons, on one side of the foil, passage of the hydrogen ion through the foil, and recombination to form molecular hydrogen on the other side of the foil. Hydrogen ion porous solid metallic foil may be of any metal which does not interfere with the hydrogen production reactions and provides sufficient hydrogen ion diffusion through the foil. Suitable metals include palladium, nickel, cobalt, iron, ruthenium, rhodium, osmium, iridium, platinum, titanium, zirconium, hafnium, vanadium, niobium, tantalum, copper, silver and gold, and alloys thereof, particularly palladium, copper nickel and palladium silver alloys. Membrane foils of copper, nickel, and mixtures thereof are particularly preferred due to their high mechanical stability and low cost. Suitable thicknesses of the foils are about 0.0001 to about 0.001 inch, the lower thickness being limited by the requirement of providing a hole-free foil. Preferably, the metallic foil is thinner than 0.0005 inch. A mechanical support, such as an inert porous support of perforated metal, expanded metal, porous metal, or a porous ceramic, may be used to allow utilization of thinner foils to provide higher hydrogen ion diffusion through the solid metallic foil. Numerous mechanical configurations of the metallic foil may be used, as are well known in the semi-permeable membrane industry. One of the preferred configurations is a plurality of fine metallic foil tubes, suitably manifolded, providing high mechanical strength and permitting the use of thin metallic foils for high transfer rates of hydrogen ion.

Figure 1:
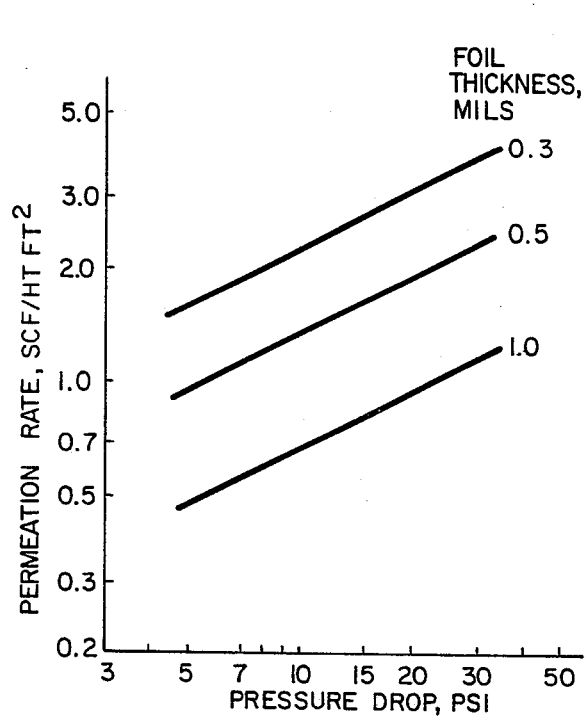
FIG. 1 is a graph showing passage of hydrogen ion through nickel foil.

Nickel is an attractive hydrogen ion transfer metallic foil due to its lower cost than many of the other metallic foils suggested for this use. Nickel is a preferred hydrogen ion passing foil at temperatures of about 1000° to about 1400° F. associated with gas conversion processes with which the steam/methane reforming and water-gas-shift reactions may be associated. At 1200° F., hydrogen ion passage through nickel foil is $1.78 \times 10^{-5} cm^3 - cm/sec-cm^2-atm^{\frac{1}{2}}$. FIG. 1 shows calculated hydrogen ion passage through nickel foils of various thicknesses at 1200° F. with pressure differentials of 5 to 35 psi. Nickel foils of greater than 0.3 mils thickness are currently available and guaranteed by producers to be pinhole free. Therefore, with pressure drops in the order of 1 atmosphere, permeation rates in the order of 2SCF/hr-ft$^2$ should be attainable.

Considering the steam/methane reforming reaction, a steam/methane reformer operating at 300 psia and 1250° F. with a steam/methane ratio of 3 results in a thermodynamic conversion of methane of about 43 percent. The product gas equilibrium composition is:

TABLE I

| Component | Moles/100 moles CH$_4$ fed | Partial Pressure psia |
| --- | --- | --- |
| CH$_4$ | 57.2 | 39 |
| H$_2$O | 198.6 | 134 |
| CO | 27.0 | 18 |
| H$_2$ | 144.2 | 98 |
| CO$_2$ | 15.8 | 11 |

Figure 2:
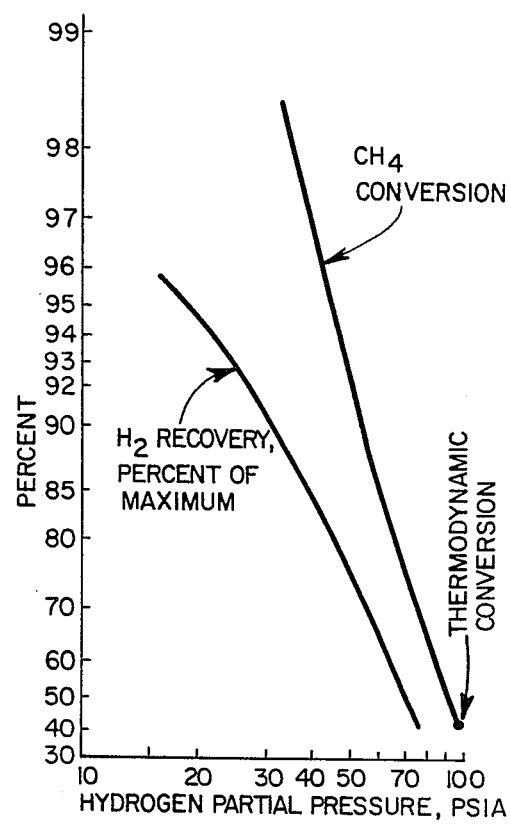
FIG. 2 is a graph showing methane conversion and hydrogen recovery in a steam/methane reforming process according to this invention.

When the gaseous output of such a reactor is passed in contact with a nickel foil hydrogen ion passing membrane external to the reactor reducing the partial pressure of hydrogen in the reformed gas product to 30 psia, approximately 27.8 percent of the theoretical hydrogen production could be recovered through the nickel foil. (111 moles H$_2$ out of 400 moles H$_2$ possible with 100 moles CH$_4$ fed) When the nickel foil is located within the reforming reaction zone, allowing hydrogen partial pressure to be reduced to 30 psia in the hydrogen producing reaction system, based upon hydrogen ion permeation illustrated in FIG. 1, chemical thermodynamic principles dictate that the steam and methane should further react. Theoretically, thermodynamic methane conversion increases to 98.5 percent and 90 percent of the theoretical hydrogen production is recovered through the nickel foil. (360 moles H$_2$ out of 400 moles H$_2$ possible with 100 moles CH$_4$ fed) These relationships are shown in FIG. 2.

Figure 3:
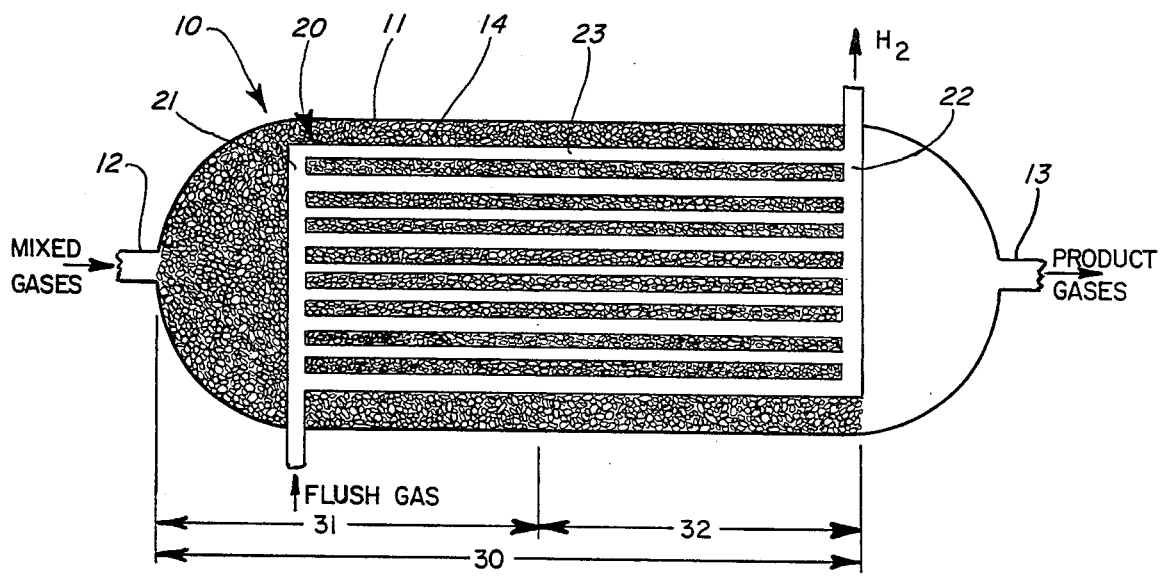
FIG. 3 is a highly stylized diagram of a reactor according to this invention.

Hydrogen forming reactor 10 is shown in FIG. 3 having reactor casing 11 with supply conduit 12 supplying reactant gases to the interior of reactor casing 11 enclosing catalytic packing 14. The gases supplied through supply conduit 12 may be gases and vapors for reaction in hydrogen producing reactions such as the steam/methane reforming reaction and the water-gas-shift reaction. The reactant gases ar passed through catalytic packing 14 for conduct of the hydrogen forming reaction under suitable hydrogen forming reaction conditions within the reactor. It is an advantage of the present process that the feed reactant gases may be, in many instances, fed directly from the upstream processes since the hydrogen forming reactions of the present process are driven by favorable chemical equilibrium and not dependent solely upon temperature and/or pressure conditions to drive the reaction. Hydrogen withdrawal system 20 is placed within reactor 10 in hydrogen production zone 30. FIG. 3 shows hydrogen withdrawal system 20 having inlet manifold 21 and outlet manifold 22 joined by a plurality of hydrogen ion passing metallic foil tubes 23. Hydrogen may be withdrawn through outlet manifold 22 by passage of an inert flush gas introduced through manifold 21 and passed through ion passing metallic foil tubes 23 to flush out the hydrogen or inlet manifold 21 may be closed, or eliminated, and a reduced pressure down to a vacuum may be maintained in outlet manifold 22 to withdraw very pure hydrogen gas.

As shown in FIG. 3, mixed reactant gases for a hydrogen forming reaction may be fed through reactor supply conduit 12 to catalytic packed bed 14 which may comprise multiple hydrogen production zones exemplified by a first hydrogen production zone 31 and a second hydrogen production zone 32 each of which may be packed with different catalytic materials and a different hydrogen forming reaction carried out in each of the zones. The hydrogen forming reactions are carried out in the catalytic bed in close proximity to the hydrogen withdrawal system which is placed within the reaction bed. Hydrogen formed by the hydrogen forming reaction is withdrawn through the hydrogen withdrawal system thereby changing the hydrogen forming reaction equilibria within the hydrogen production zone. Other product gases are withdrawn through the reactor product conduit 13.

The hydrogen forming reactor 10 may be of any shape, size and material as known to the art for conduct of hydrogen forming reactions at temperatures and pressures desired for the process of this invention. Generally, plant equipment may be significantly reduced by the practice of this invention since in many instances the mixed gases supplied to the hydrogen forming reaction system of this invention may be supplied directly from upstream processes, such as coal gasification, without the requirement of temperature adjustment to drive the hydrogen forming reaction. Likewise, conventional downstream hydrogen purification equipment may be eliminated due to the very pure hydrogen withdrawn from the hydrogen forming reaction systems according to the present invention. Generally, the high cost of hydrogen ion permeable metallic foils used in the process of this invention is more than offset by the reduction in other plant equipment and reductions in the cost of operating and maintaining such equipment which is eliminated or reduced in size by practice of this invention.

The following specific examples for utilization of this invention are set forth in detail with respect to reaction conditions and material and are not intended to limit this invention in any way.

A single stage fluidized bed gasifier may be operated with bed of coal and limestone for sulfur removal by methods known to the art for production of gas at 1875° F. and 500 psia favoring hydrogen production having a composition:

TABLE II

| Component | Percent |
|---|---|
| $H_2$ | 27.0 |
| $CH_4$ | 7.4 |
| CO | 33.4 |
| $CO_2$ | 14.7 |
| $H_2O$ | 16.8 |
| $N_2$ | 0.4 |
| $H_2S$ | 0.2 |
| $NH_3$ | 0.1 |

The gas mixture is cooled to about 1200° F. and passed through a water-gas-shift reactor utilizing cobalt molybdenum as a sulfur tolerant water-gas-shift catalyst. A plurality of nickel 0.0005 inch thick foil tubes having an inner inert porous ceramic support are passed through the water-gas-shift reaction zon transferring hydrogen from the gasifier product gas and from the water-gas-shift reaction to the inside of the nickel foil tubes. The nickel foil tubes are manifolded at the exit end and hydrogen is withdrawn from the hydrogen withdrawal system.

A second downstream portion of the same reactor may contain a sulfur tolerant steam/methane reforming catalyst, such as molybdenum sulfides and zirconium oxide, for reforming residual methane to additional hydrogen which passes to the interior of the nickel foil tubes enhancing production of hydrogen by the steam/methane reforming reaction.

Water vapor may be added to either or both stages of the process to avoid carbon deposition and to add water for enhancement of the hydrogen production reaction.

When a fluidized bed coal gasifier is operated to favor methane production and the product gas reacted over a sulfur tolerant methanation catalyst at an equilibrium temperature of 900° F. followed by high temperature sulfur removal by the METC zinc ferrite process, the gas composition would be:

TABLE III

| Components | Composition, % |
|---|---|
| $H_2$ | 2.72 |
| $CH_4$ | 30.81 |
| CO | 1.09 |
| $CO_2$ | 46.44 |
| $H_2O$ | 18.38 |
| $N_2$ | 0.56 |

The above mixed gas would be at 1200° F. and may be transferred directly to a water-gas-shift reactor as described above which with 90 percent hydrogen removal would result in the gas mixture shown in Table IV:

TABLE IV

| Components | Composition, % |
|---|---|
| $H_2$ | .03 |
| $CH_4$ | 32.00 |
| CO | .04 |
| $CO_2$ | 49.35 |
| $H_2O$ | 18.0 |
| $N_2$ | 0.59 | which after H₂O and CO₂ removal would have the following composition satisfactory for pipeline distribution as SNG:

TABLE V

| Components | Composition, % |
|---|---|
| $H_2$ | .09 |
| $CH_4$ | 98.01 |
| CO | .10 |
| $CO_2$ | 0.0 |
| $H_2O$ | 0.0 |
| $N_2$ | 1.8 |

Another important application of the proces of this invention is in the conventional steam/methane reforming process for ammonia production. Conventionally, a first stage of reaction is conducted at 1500° F. and 150 psi with a steam/methane ratio of 3.0 to result in an equilibrium conversion of about 89 percent of the methane to carbon monoxide and hydrogen. To obtain further conversion, prior processes have passed the gases over a secondary reforming stage at temperatures of about 1800° F. which requires reactor constructed of expensive materials and further requires extensive purification of the mixed gas product by acid gas removal and cryogenic scrubbing to provide the high purity hydrogen necessary for ammonia conversion catalysts. By incorporation of the present invention in a single stage steam/methane catalytic reaction conducted at the lower temperature of 1200° F., with a hydrogen removal rate of 90 percent of the production rate, over 99 percent conversion of the methane can be accomplished at the lower temperature. The lower temperature reaction may be conducted in a single stage reactor of less expensive material and more importantly, the hydrogen recovered would be extremely pure and in many cases satisfactory to go directly to the ammonia conversion stage without additional processing.

Another important potential for the process of this invention is in thermochemical recuperator systems in which waste heat from a furnace is used to drive endothermic chemical reactions in the fuel gas to be fed to the furnace. The steam/methane reforming reaction is employed in thermochemical recuperator systems at pressures of about 25 psia and 1200° F. with a steam/methane ratio of 2.0 providing a thermodynamic equilibrium conversion of the methane of 70.2 percent. Incorporation of the process of this invention could result in conversions of greater than 99 percent under the same conditions of temperature and pressure and provide approximately 43 percent greater heat recovery from the high temperature gases. Additionally, the hydrogen withdrawn from the hydrogen forming reaction may be used to provide higher temperature combustion within the furnace resulting in higher overall efficiency of the total system.

While the parent application to issue as U.S. Pat. No. 4,702,973, provides a process for internal steam/methane reforming for production of hydrogen in molten carbonate fuel cell anodes, the process of this invention may also be used for production of high purity hydrogen advantageously produced external to the fuel cell as a cell fuel. Utilization of high purity hydrogen obtained according to the process of this invention as a fuel cell fuel for molten carbonate fuel cells eliminates H₂O and CO₂ from the anode feed which reduces the Nernst polarization of the cell and thereby increases the overall voltage of the fuel cell stack. The high purity hydrogen obtained by the process of this invention may advantageously be used for fuel feed in phosphoric acid fuel cells wherein prior problems of CO catalyst poisoning would be eliminated and the fuel cell stacks could be operated at reduced temperature for longer catalyst life and since diluent CO₂ is not present, concentration polarizations would be eliminated providing essentially full utilization of the hydrogen fuel.

The very pure hydrogen produced by the process of this invention may be used in any industrial application including for example, vegetable oil hydrogenation, float glass tin bath operation, pharmaceutical manufacture, microchip manufacture, generator cooling in large power plants, and in direct ore reduction, such as iron ore.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A hydrogen forming process comprising: conducting in a hydrogen production zone a chemical reaction forming mixed gases comprising molecular hydrogen; contacting one side of a hydrogen ion porous and molecular gas nonporous metallic foil with said mixed gases in said hydrogen production zone; dissociating said molecular hydrogen to ionic hydrogen on said one side of said metallic foil; passing said ionic hydrogen through said metallic foil to its other side; and withdrawing hydrogen from said other side of said metallic foil, thereby removing hydrogen from said hydrogen production zone.

2. A hydrogen forming process of claim 1 wherein said metallic foil is selected from the group consisting of palladium, nickel, cobalt, iron, ruthenium, rhodium, osmium, iridium, platinum, titanium, zirconium, hafnium, vanadium, niobium, tantalum, copper, silver, gold and mixtures thereof.

3. A hydrogen forminq process of claim 1 wherein said metallic foil is selected from the group consisting of copper, nickel, and mixtures thereof.

4. A hydrogen forming process of claim 1 wherein said metallic foil is about 0.0001 to about 0.001 inch thick.

5. A hydrogen forming process of claim 1 wherein said metallic foil is about 0.0001 to about 0.0005 inch thick.

6. A hydrogen forming process of claim 1 wherein said metallic foil has a mechanical support selected from the group consisting of perforated metal, expanded metal, porous metal, and porous ceramic, and mixtures thereof.

7. A hydrogen forming process of claim 1 wherein said metallic foil is in the form of a plurality of tubes within said hydrogen production zone and having a manifold at a withdrawal end.

8. A hydrogen forming process of claim 1 wherein said hydrogen production zone is maintained at about 1000° to about 1400° F.

9. A hydrogen forming process of claim 1 wherein said chemical reaction comprises a steam/methane reforming reaction:

$$CH_4 + 2H_2O \rightarrow CO_2 + 4H_2.$$

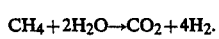

10. A hydrogen forming process of claim 1 wherein said chemical reaction comprises a water-gas-shift reaction:

$$CO + H_2O \rightarrow CO_2 + H_2.$$

11. A hydrogen forming process of claim 1 wherein said metallic foil is nickel about 0.001 to about 0.0001 inch thick in the form of a plurality of tubes within said hydrogen production zone and having a manifold at a withdrawal end, said hydrogen production zone maintained at about 1000° to about 1400° F.

12. In a hydrogen forming process wherein a chemical reaction forming mixed gases comprising hydrogen is conducted in a hydrogen production zone, the improvement comprising: contacting one side of a hydrogen ion porous and molecular gas non-porous metallic foil with said mixed gases in said hydrogen production zone, passing hydrogen as hydrogen ions through said metallic foil to its other side, and withdrawing hydrogen from said other side of said metallic foil thereby removing hydrogen from said hydrogen production zone.

13. In a hydrogen forming process of claim 12 wherein said metallic foil is selected from the group consisting of palladium, nickel, cobalt, iron, ruthenium, rhodium, osmium, iridium, platinum, titanium, zirconium, hafnium, vanadium, niobium, tantalum, copper, silver, gold and mixtures thereof.

14. In a hydrogen forming process of claim 12 wherein said metallic foil is selected from the group consisting of copper, nickel, and mixtures thereof.

15. In a hydrogen forming process of claim 12 wherein said metallic foil is about 0.0001 to about 0.001 inch.

16. In a hydrogen forming process of claim 12 wherein said metallic foil is about 0.0001 to about 0.0005 inch thick.

17. In a hydrogen forming process of claim 12 wherein said metallic foil has a mechanical support selected from the group consisting of perforated metal, expanded metal, porous metal, and porous ceramic, and mixtures thereof.

18. In a hydrogen forming process of claim 12 wherein said metallic foil is in the form of a plurality of tubes within said hydrogen production zone and having a manifold at a withdrawal end.

19. In a hydrogen forming process of claim 12 wherein said hydrogen production zone is maintained at about 1000° to about 1400° F.

20. In a hydrogen forming process of claim 12 wherein said chemical reaction comprises a steam/methane reforming reaction:

$$CH_4 + 2H_2O \rightarrow CO_2 + 4H_2.$$

21. In a hydrogen forming process of claim 12 wherein said chemical reaction comprises a water-gas-shift reaction:

$$CO + H_2O \rightarrow CO_2 + H_2.$$

22. In a hydrogen forming process of claim 12 wherein said metallic foil is nickel about 0.001 to about 0.0001 inch thick in the form of a plurality of tubes within said hydrogen production zone and having a manifold at a withdrawal end, said hydrogen production zone maintained at about 1000° to about 1400° F.

* * * * *